United States Patent [19]

Scag

[11] Patent Number: 5,601,512
[45] Date of Patent: Feb. 11, 1997

[54] REVERSE SPEED CONTROL FOR LAWN MOWERS

[75] Inventor: Dane T. Scag, Elm Grove, Wis.

[73] Assignee: Snapper, Inc., McDonough, Ga.

[21] Appl. No.: 543,873

[22] Filed: Oct. 19, 1995

[51] Int. Cl.⁶ .................................................. B60K 41/04
[52] U.S. Cl. ...................... 477/111; 477/906; 56/10.2 G; 56/10.5
[58] Field of Search ........................ 477/107, 111, 477/99, 906; 56/11.1, 11.2, 11.4, 16.7, 10.2 G, 10.2 H, 10.5, 10.8, 11.3

[56]  References Cited

U.S. PATENT DOCUMENTS

| 3,925,970 | 12/1975 | Rusco . | |
| 3,973,379 | 8/1976 | Ecker et al. . | |
| 4,016,709 | 4/1977 | Hauser et al. . | |
| 4,689,939 | 9/1987 | Seyerle | 56/11.1 |
| 4,704,847 | 11/1987 | Greider et al. | 56/10.5 |
| 4,753,062 | 6/1988 | Roelle | 56/10.5 |
| 4,967,543 | 11/1990 | Scag et al. | 56/11.1 X |
| 4,991,382 | 2/1991 | Scag | 56/11.4 X |
| 5,021,955 | 6/1991 | Ito et al. | 477/906 X |
| 5,161,503 | 11/1992 | Yano et al. | 477/111 X |
| 5,445,575 | 8/1995 | Sundeen | 477/99 |

Primary Examiner—Charles A. Marmor
Assistant Examiner—Peter Kwon
Attorney, Agent, or Firm—Jones & Askew

[57] ABSTRACT

A self-propelled lawn mower and control system for same which prevents the lawn mower from operating at high engine speed while in reverse, while still allowing a wide range of throttle speeds while in forward drive mode. Normally-open switches are closed to ground the primary ignition circuit when the lawn mower is in reverse and above a throttle speed threshold.

3 Claims, 3 Drawing Sheets

REVERSE SPEED CONTROL FOR LAWN MOWERS

TECHNICAL FIELD

This invention relates in general to lawn mowers, and particularly relates to lawn mowers having self-propelling features.

BACKGROUND OF THE INVENTION

In the prior art, it is well recognized to provide lawn mowers having self-propelled features, such that the lawn mower's engine, and not the operator, provides the primary source of moving power. However, to date the prior art has not adequately addressed the above-referenced issues relating to the use of such mowers at high throttle speeds in reverse drive modes. As may be understood, when the transmission of a lawn mower is placed in its "REVERSE" drive mode, the lawn mower (in the case of a walk-behind lawn mower) will be moving towards the operator. When such a situation arises, it may be understood that it is preferable to have the engine of the mower set at a low (preferably "IDLE") throttle speed setting, in order to minimize the chances for injury to the operator.

The prior art has attempted to address this situation by providing mechanically interlocking apparatus which force a lower throttle setting when "reverse" is selected, but this arrangement has been found to be disadvantageous as the mechanical linkages can require a significant amount of adjustment throughout the life of their use.

Notwithstanding the existence of the above-referenced prior art, there is always a need to provide improvements thereto.

SUMMARY OF THE INVENTION

The present invention overcomes inadequacies in the prior art by providing a lawn mower speed control means which encourages the operator to use a low engine throttle setting while the lawn mower is in its "REVERSE" drive setting.

Generally described, the present invention relates to the use of an "engine kill" feature which is enabled when a self-propelled lawn mower is in a high throttle setting at the same time it is in reverse.

More particularly described, the present invention relates to the use of such an engine kill feature which allows the operator to "recover" engine ignition by placing the mower at a lower throttle setting or by placing the mower in its neutral or forward drive mode.

Therefore it is an object of the present invention to provide a lawn mower which is easier to use by an operator.

It is a further object of the present invention to provide a lawn mower which includes an additional safety feature.

It is a further object of the present invention to provide a lawn mower which will not operate at high engine speeds when in reverse.

It is a further object of the present invention to provide a lawn mower control system which is easy to use.

It is a further object of the present invention to provide a lawn mower control system which is intuitive to use.

It is a further object of the present invention to provide a lawn mower control system which is cost-effective to manufacture.

Other objects, features, and advantages of the present invention will become apparent upon reading the following detailed description of the preferred embodiment of the invention when taken in conjunction with the drawing and the appended claims.

DETAILED DESCRIPTION OF THE PREFERRED EMBODIMENT

Figure 1:
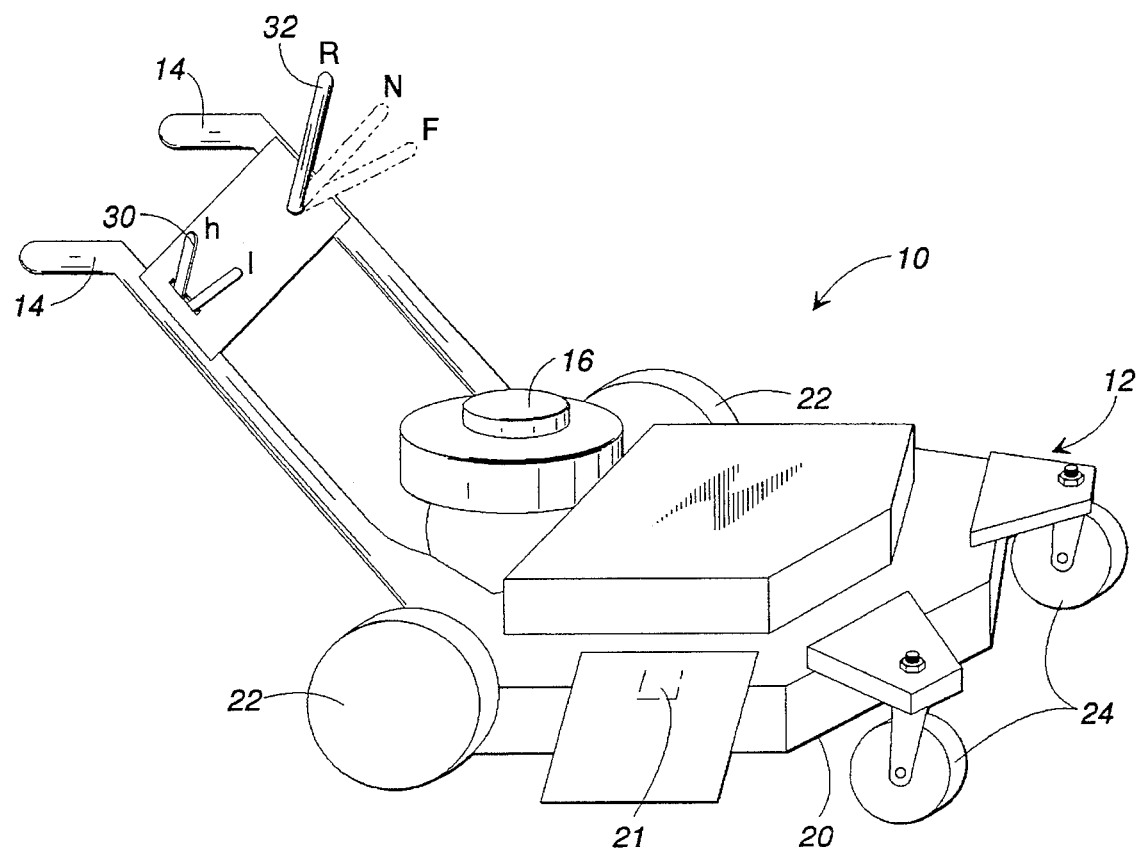
FIG. 1 is a pictorial view of a lawn mower 10 according to the present invention, operated by an operator.

Reference is now made to FIG. 1, which illustrates a walk-behind lawn mower 10 according to the present invention. This lawn mower includes a frame 12, an engine 16, handles 14, and a cutting housing 20 including a cutting blade 21. The mower 10 also includes right and left rear drive wheels 22, which may be driven in forward or reverse by one or more transmissions as known in the art.

As shown in FIGS. 2A–2D, a pair of switches may be used to facilitate one embodiment of the present invention. These two switches include a reverse recognition switch 50 and a high throttle recognition switch 51. When both of these switches are closed, they ground out the primary ignition circuit of the engine. As in one preferred embodiment of the present invention the engine is an internal combustion engine, this temporarily denies spark to the combustion chamber, which terminates the combustion process and causes the engine to eventually stop unless spark is timely reintroduced as discussed in later detail.

The high speed recognition switch 51 is used to recognize when the engine speed control is set to a relatively "high" ("h" in the drawings) speed, which is a predetermined threshold above the idle speed. When the lawn mower's engine throttle speed is set below this "high" speed and at or below a relatively "low" speed ("l" in the drawings could be idle speed), the high speed recognition switch 51 is in its open position. However, when the engine speed setting is at or above the "high" speed, the switch is closed.

The reverse recognition switch 50 is used to recognize when the transmission of the lawn mower is set into reverse. When the lawn mower's transmission is in forward or neutral, the reverse recognition switch 50 is in its open position. However, when the transmission is set to its "reverse" position ("R" in the drawings), the switch is closed, until later opened by setting the transmission to its neutral or forward speeds.

Figure 2A:
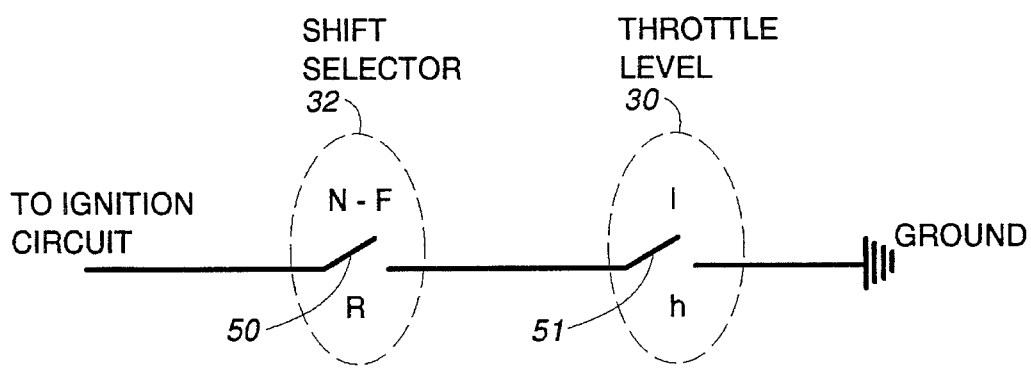
FIG. 2A illustrates the reverse recognition switch 50 and the high throttle recognition switch 51 both in their open positions; engine ignition is therefore not disabled by such switches.
Figure 2B:
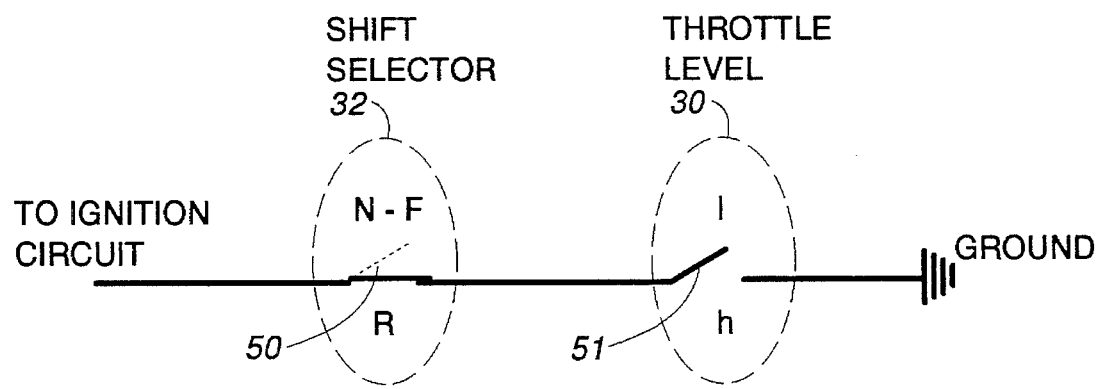
FIG. 2B illustrates the reverse recognition switch 50 in its "closed" position, with the high throttle recognition switch 51 in its open position.
Figure 2C:
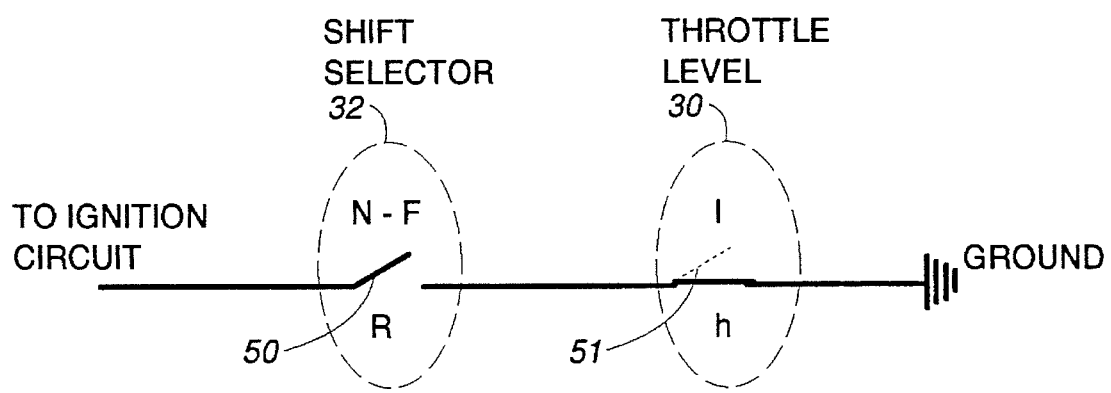
FIG. 2C illustrates the reverse recognition switch 50 in its "open" position, with the high throttle recognition switch 51 in its "closed" position.
Figure 2D:
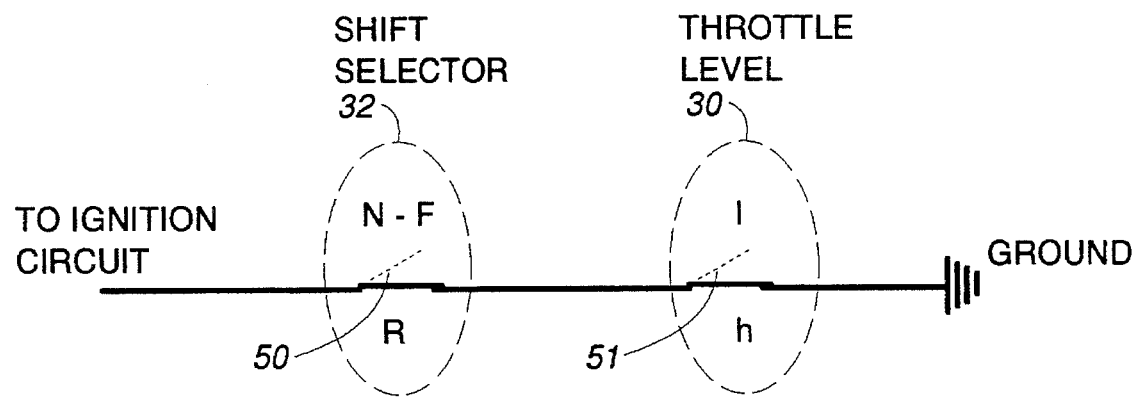
FIG. 2D illustrates the reverse recognition switch 50 and the high throttle recognition switch 51 both in their "closed" position.

As shown by the various FIGS. 2A–2D, there are four combinations of settings possible for the reverse recognition switch 50 and the high throttle recognition switch 51. FIG. 2A illustrates the reverse recognition switch 50 and the high throttle recognition switch 51 both in their open positions;

engine ignition is therefore not disabled by such switches. FIG. 2B illustrates the reverse recognition switch 50 in its "closed" position, with the high throttle recognition switch 51 in its open position. FIG. 2C illustrates the reverse recognition switch 50 in its "open" position, with the high throttle recognition switch 51 in its "closed" position. FIG. 2D illustrates the reverse recognition switch 50 and the high throttle recognition switch 51 both in their "closed" position. This is the only position out of those shown in FIGS. 4A–4D in which ignition is disabled. As denoted by the dotted lines of FIGS. 2A–2D, the shift selector 32 controls switch 50, and the throttle lever 30 controls switch 51.

A significant feature of the present invention is the "recovery" feature provided thereby. As previously discussed, when the lawn mower is set a relatively high throttle, and the transmission setting is switched from forward or neutral into reverse, engine ignition is terminated (or "killed"). At that instant it is still possible to "recover" engine ignition and speed by either 1) quickly lowering engine throttle by manipulating lever 30 or 2) quickly selecting neutral or a forward speed of the transmission by manipulating lever 32. To allow for recovery, however, one of these two steps must be completed before the engine is allowed to slow down so much that is cannot recover even if ignition is restored.

Figure 3:
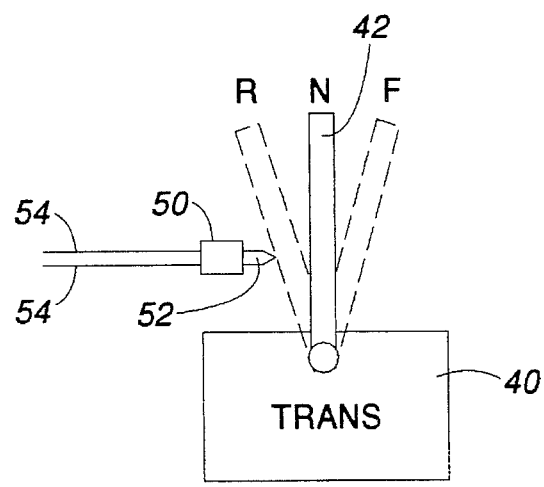
FIG. 3 is an illustrative view showing the operations of a control according to the present invention.

The reverse recognition means may in one embodiment be provided by a configuration as shown in FIG. 3, wherein a transmission gear selector lever 42 of a conventional transmission 40 is used by the operator in order to select forward or reverse wheel directions. As may be seen, a switch reverse recognition switch 50 (having a trigger 52) can be used to determine when the lever 42 is in the vicinity of its "reverse" ("R" in FIG. 3) position. When the lever 42 is in the vicinity of its reverse position, the switch is closed, providing the opportunity for electrical current flow intermediate the two electrical leads 54 of the reverse recognition switch 50. As discussed above, if the high throttle recognition switch of the lawn mower is also closed, engine ignition will be disabled. It should be understood that this is only one way of providing a reverse recognition switch; other means known in the art may also be used to provide switch 50 or switch 52 without departing from the spirit and scope of the present invention.

While this invention has been described in specific detail with reference to the disclosed embodiments, it will be understood that many variations and modifications may be effected within the spirit and scope of the invention as described in the appended claims.

What is claimed is:

1. A lawn mower comprising:

a frame;

an engine mounted relative to said frame said engine having an ignition source;

a drive wheel capable of being driven by said motor in either a forward or a reverse direction;

engine speed control means for controlling the speed of said engine between a range including a low and high speed;

engine ignition shut-off means for shutting off said ignition source of said engine responsive to the placement of said engine speed control means at said high speed when said drive wheel is driven in reverse.

2. A lawn mower comprising:

a frame;

an engine mounted relative to said frame said engine having an ignition source;

a drive wheel capable of being driven by said motor in either a forward or a reverse direction;

engine speed control means for controlling the speed of said engine between a range including a low and high speed;

engine ignition shut-off means for shutting off said ignition source of said engine responsive to the placement of said engine speed control means at said high speed when said drive wheel is driven in reverse, said engine ignition cut-off means comprising:

a) a high speed recognition switch; and b) a reverse recognition switch.

3. A lawn mower comprising:

a frame;

an engine mounted relative to said frame said engine having an ignition source;

a drive wheel capable of being driven by said motor in either a forward or a reverse direction;

engine speed control means for controlling the speed of said engine between a range including a low and high speed;

engine ignition shut-off means for shutting off said ignition source or said engine responsive to the placement of said engine speed control means at said high speed when said drive wheel is driven in reverse, said engine ignition cut-off means comprising an ignition kill circuit:

a) a high speed recognition switch; and b) a reverse recognition switch, said reverse recognition switch and said high speed recognition switch being configured to close said ignition kill circuit and disable said engine ignition source upon said placement of said engine speed control means at said high speed when said drive wheel is driven in reverse.

* * * * *